United States Patent [19]

Mignani et al.

[11] Patent Number: 5,470,933
[45] Date of Patent: Nov. 28, 1995

[54] PREPARATION OF POLYAMINOBORAZINES

[75] Inventors: Gérard Mignani, Lyons; Christophe Richard, Corbas; Roger Trichon, Villeurbanne, all of France

[73] Assignee: Rhone-Poulenc Chimie, Courbevoie Cedex, France

[21] Appl. No.: 120,815

[22] Filed: Sep. 15, 1993

[30] Foreign Application Priority Data

Sep. 15, 1992 [FR] France .................................. 92 10952

[51] Int. Cl.$^6$ ..................................................... C08F 30/06
[52] U.S. Cl. ................................ 528/24; 528/12; 528/30; 564/10; 526/239
[58] Field of Search ................................ 528/24, 30, 12; 568/220; 526/239

[56] References Cited

U.S. PATENT DOCUMENTS

| | | | |
|---|---|---|---|
| 2,754,177 | 7/1956 | Gould | 556/403 |
| 4,578,283 | 3/1986 | Kirtley et al. | 427/85 |
| 4,906,763 | 3/1990 | Paciorek et al. | 528/30 |
| 5,188,757 | 2/1993 | Paine, Jr. et al. | 252/183.11 |
| 5,202,399 | 4/1993 | Sneddon et al. | 526/239 |

FOREIGN PATENT DOCUMENTS 0104412  4/1984  European Pat. Off. .

OTHER PUBLICATIONS

Journal of Polymer Science, Polymer Chemistry Edition, vol. 24, Jan. 1986, New York, pp. 173–185, Paciorek et al. "Boron–Nitrogen Polymers . . . Mechanistic Studies of Borazine Pyrolyses".

*Primary Examiner*—P. Hampton-Hightower
*Attorney, Agent, or Firm*—Burns, Doane, Swecker & Mathis

[57] ABSTRACT

Monodisperse, homogeneous polyaminoborazines, well suited for pyrolysis into ceramic BN shaped articles, e.g., fibers, films, etc., are prepared by thermally polycondensing a trifunctional aminoborazine under conditions of polycondensation reaction equilibrium.

17 Claims, 1 Drawing Sheet

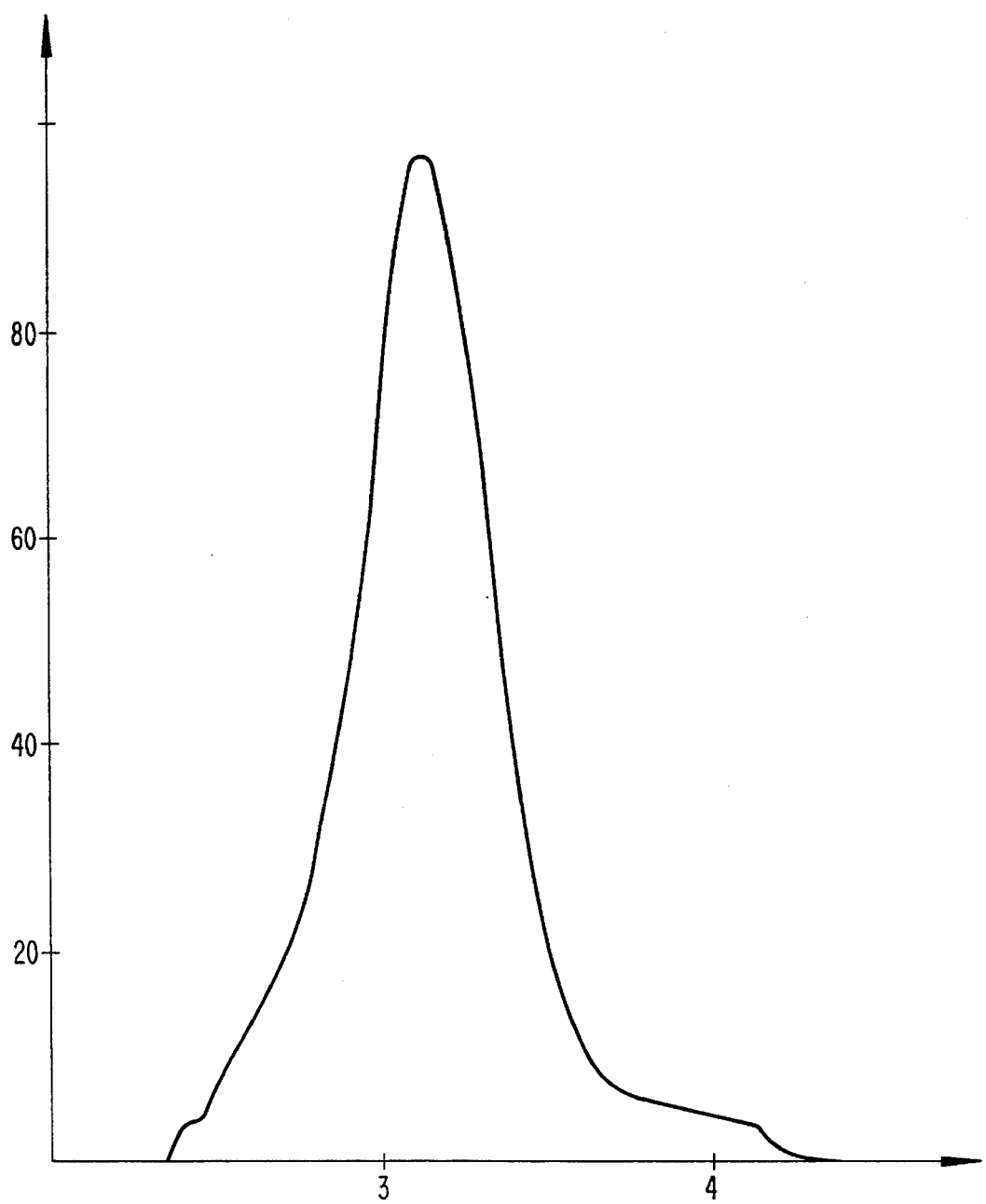

PREPARATION OF POLYAMINOBORAZINES

BACKGROUND OF THE INVENTION

1. Field of the Invention

The present invention relates to the preparation of unique polyaminoborazines, to such polyaminoborazines, per se, and to the use of these polymers for the manufacture of ceramic materials and shaped articles based on boron nitride, especially in the form of fibers, films, matrices, coatings, powders and solid parts.

2. Description of the Prior Art

To produce a precursor polymer of ceramic materials based on boron nitride whose pyrolysis behavior and, thus, the yield by weight of boron nitride are improved, it is known to this art to thermally polycondense trifunctional aminoborazines. For example, the thermal polycondensation of various aminoborazines in the presence or in the absence of a heavy amine has been described in EP 0,342,673, GB 2,163,761 and EP 0,384,857.

However, the polyaminoborazines thus produced present the disadvantage of not being homogeneous, namely, such pollers have a polydisperse distribution of their molecular weight, promoting the formation of gels. This formation of gels has the consequence of making it problematical, indeed difficult, to shape these polymers and of producing materials, shaped from these polymers, whose mechanical properties are not satisfactory. By reason of their heterogeneity, these polyaminoborazines can also be partially insoluble and/or can melt at temperatures which are too high to permit the easy shaping thereof.

SUMMARY OF THE INVENTION

Accordingly, a major object of the present invention is the provision of homogeneous polyaminoborazine polymers having a monodisperse molecular weight distribution, the preparation of which avoids or conspicuously ameliorates the disadvantages and drawbacks to date characterizing the state of this art.

Another object of the present invention is the provision, with a high degree of conversion, of such novel polyaminoborazines that are converted, after pyrolysis, into ceramic materials in a high yield by weight.

Briefly, the present invention features a process for the preparation of polyaminoborazines by thermally polycondensing trifunctional aminoborazines, wherein, to produce homogeneous polyaminoborazines, the polycondensation reaction is Carried out at equilibrium.

DETAILED DESCRIPTION OF PREFERRED EMBODIMENTS OF THE INVENTION

More particularly according to the present invention, the trifunctional aminoborazines are well known cyclic compounds having the following general formula:

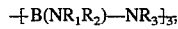

wherein $R_1$, $R_2$ and $R_3$, which may be identical or different, are each a hydrogen atom, or a saturated or unsaturated alkyl or aryl radical.

These are especially described in R. Toeniskoetter et al., *Inorg. Chem.*, 2, page 29 (1963); U.S. Pat. No. 2,754,177; K. Niedenzu et al., *Chem. Ber.*, 94, page 671 (1960) and K. Niedenzu et al., *J. Am. Chem. Soc.*, 20, page 3561 (1959).

The aminoborazine starting materials for the process of the present invention can also be in the form of mixtures of monomers, of dimers and optionally of trimers of such trifunctional aminoborazines.

Preferably, trifunctional aminoborazines are employed, wherein $R_3$ is hydrogen and/or $R_1$ and $R_2$ are alkyl radicals, more preferably saturated alkyl radicals.

More preferably, $R_1$ and $R_2$ are saturated $C_1$ to $C_4$ alkyl radicals. Particularly representative thereof are methyl, ethyl or propyl radicals.

It has thus surprisingly and advantageously been discovered that equilibrium of the polycondensation reaction of trifunctional aminoborazines can be attained and that such equilibrium permits controlling the polymerization of trifunctional aminoborazines. The polyaminoborazines thus produced can more particularly melt and/or are soluble in the majority of the common solvents, such as tetrahydrofuran, dimethylacetamide or chloroform.

Thus, and without wishing to be bound to or by any particular theory, the principal reaction for the preparation of polyaminoborazines by thermal polycondensation according to this invention would appear to entail the reaction mechanism:

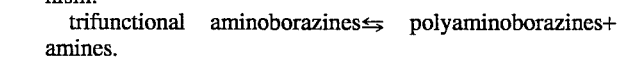

The temperature and the partial pressure of the amines produced during the polycondensation are the physical factors of such equilibrium. These factors must consequently be controlled, more particularly the partial pressure of the amines must be other than O.

This reaction equilibrium can advantageously be displaced, as desired, in the direction of the polycondensation reaction by varying either the temperature of the reaction mixture or the partial pressure of the amines produced during the polycondensation, while varying, or permitting to vary, the other parameter.

In a preferred embodiment of the present invention, equilibrium is provided by increasing the temperature, if the partial pressure of the amines produced is allowed to increase. This preferred embodiment is carried out by any means per se known to this art, more particularly By natural substitution of the inert gas present in the reactor at the start by the amines produced during the polycondensation, while increasing the temperature.

The state of the art, on the other hand, describes purging under an inert atmosphere during the thermal polycondensation, which is equivalent to imposing a partial pressure of amines produced of zero, whereas the polycondensation temperature is fixed.

The most typical inert gases are nitrogen and argon.

The thermal polycondensation of aminoborazines is generally carried out at a temperature ranging from 150° C. to 350° C., preferably at a temperature ranging from 200° C. to 250° C.

The process according to the invention is carried out in bulk, or in solution in a polar aprotic solvent (dimethylethylene urea or N-methylpyrrolidone, for example), or a nonpolar aprotic solvent (chlorobenzene or decalin, for example) and under anhydrous conditions.

The single Figure of Drawing a chromatogram of the gel permeation chromatography of polyaminoborazines prepared according to the process of the present invention.

The homogeneity of the polyaminoborazines provided by the process of the present invention, optionally after removal of the solvent (distillation or other methods), is determined by interpreting the chromatograms of the gel permeation chromatographies of the polyaminoborazines thus obtained. Such homogeneity is apparent from said Figure of Drawing.

The present invention also features the polyaminoborazines, per se, prepared according to the process described above. These polyaminoborazines present the advantage of being homogeneous.

Taking account of their quality, the polyaminoborazines prepared via the process of the present invention find a very specific application for the manufacture of shaped ceramic products based on boron nitride, especially in the form of fibers, films, matrices, coatings, powders and solid shaped articles.

In the most general case, the polymer is then pyrolyzed in an inert atmosphere, under vacuum or under ammonia, at a temperature ranging from 100° C. to 2,000° C., until the polymer is converted entirely into a ceramic based on boron nitride.

The polymer, prior to pyrolysis, can also be shaped by film-forming, by molding or by spinning, for example. In the event that it is desired to obtain fibers, the polymer is spun by means of a conventional die, after fusion or dissolution of the polymer, and is then pyrolyzed at a temperature ranging from 100° C. to 2,000° C. under vacuum, under an inert atmosphere (argon or nitrogen) or under ammonia to convert it into boron nitride.

It is preferable, after shaping the polymer, in order to improve the thermal behavior of the polymer and thus to increase the yields during the subsequent pyrolysis, subject the shaped polymer to a physical (thermal), chemical (hydrolysis) or radioactive (electrons, U.V.) treatment.

In order to further illustrate the present invention and the advantages thereof, the following specific examples are given, it being understood that same are intended only as illustrative and in nowise limitative.

In said examples to follow, $M_n$ and $M_w$ are, respectively, the number-average molecular weight and the weight-average molecular weight, THF is tetrahydrofuran, DMAC is N,N-dimethylacetamide, NMP is N-methylpyrrolidone, rev/min connotes stirring in revolutions per minute, and all percentages are given by weight, except where otherwise indicated.

The $M_n$ and $M_w$ values were obtained from analyses carried out by gel permeation chromatography using a THF/DMAC mixture with an 80/20 composition by volume as eluent and polystyrene as reference.

These values obtained and reported for $M_n$ and $M_w$ are relative and must therefore be multiplied by 2.5 to provide the true $M_n$ and $M_w$ values of the resulting polyaminoborazines.

EXAMPLE 1

55.0 g of B-tris(propylamino)borazine were introduced into a 500 cm$^3$ open reactor under an inert atmosphere (nitrogen). Stirring was provided by an anchor whose rate of rotation was 3 rev/min. The reactor was then immersed in a metal bath at 100° C. whose temperature was increased to 220° C. at the rate of 1° C./min. The temperature was then maintained at this value for 5 hours.

During the test, the reactor was not purged with a nitrogen stream; the propylamine produced remained in the headspace of the reactor. The excess propylamine in the headspace of the reactor diffused in a nitrogen stream and was collected in a water tank where it was assayed by 2N hydrochloric acid. At the end of the stationary phase, the assayed basicity was 5.57 eq/kg (theoretical maximum 5.96 eq/kg), i.e., a degree of conversion of 93.4%. The mixture was then permitted to cool to room temperature. The weight loss was 32.9% (theoretical maximum=35.2%).

Despite the high degree of conversion, the polymer obtained had a glass transition and was soluble in the usual organic solvents.

Its softening temperature, measured on a Kofler bench, was approximately 115° C. Under these conditions, the polymer had $M_n$ and $M_w$ values of 1,040 and 1,460, respectively.

The single Figure of Drawing corresponds to a cumulative curve by weight (expressed in percentage) as a function of the log of M, M representing the molar weight, obtained by gel permeation chromatography.

Said Figure of Drawing corresponds to the chromatogram of the polymer obtained.

EXAMPLE 2

53.3 g of B-tris(propylamino)borazine were polycondensed under conditions analogous to those of Example 1. The temperature of the stationary or steady phase was 240° C. and it wets carried out for 4 hours. The assayed basicity was 6.13 eq/kg and the weight loss was 35.65%.

The polymer had a softening temperature of 70° C. and $M_n$ and $M_w$ values of 1,300 and 2,200, respectively.

EXAMPLE 3

53.2 g of B-tri(propylamino)borazine were polycondensed under conditions analogous to those in Example 1. The temperature of the stationary phase was 180° C. and it was carried out for 14 hours. The assayed basicity was 4.21 eq/kg and the weight loss was 24.1%.

The polymer had a softening temperature of less than 20° C. and $M_n$ and $M_w$ values of 920 and 1,180, respectively.

EXAMPLE 4 (Comparative)

55.8 g of B-tris(propylamino)borazine were introduced into the 500 cm$^3$ open reactor. The temperature programming was identical to that of Example 1 (100° to 220° C. at 1° C./min and then a stationary phase of 5 hours at 220° C.). However, during this test, the headspace of the reactor was purged with a nitrogen stream of 5 l/h. At the end of the stationary phase, the assayed basicity was 6.16 eq/kg and the weight loss reached 36.4%.

The polymer obtained under these conditions had a softening temperature of 230° C. and had little solubility in organic solvents (DMAC, NMP), the soluble fraction of the polymer had $M_n$ and $M_w$ values of 1,470 and 3,230, respectively.

EXAMPLE 5

59.5 g of B-tris(methylamino)borazine were polycondensed under conditions analogous to those in Example 1. The temperature of the stationary phase was 200° C. and it was carried out for 17 hours. The weight loss was 27.5% (theoretical maximum=27.8%), i.e., a degree of conversion of 99%.

The polymer obtained had a softening temperature of 200° C. and $M_n$ and $M_2$ values of 810 and 1,230, respectively.

EXAMPLE 6

1. Polycondensation 56.7 g of B-tripropylaminoborazine were introduced, under nitrogen, into a 500 ml open rector.

Stirring was provided by an anchor whose rate of rotation was 3 rev/min. The setup was rendered inert via a nitrogen stream (5 l/h) in the headspace of the reactor. The latter was immersed in a metal bath at 100° C. and the temperature of the bath was then increased to 220° C. at the rate of 1° C./min. The temperature was then maintained stationary, or constant, for 2 hours, 45 minutes.

During the reaction, purging of the reactor by a nitrogen stream was halted and the propylamine produced remained in the headspace of the reactor. The excess propylamine which diffused was assayed by 2N hydrochloric acid in the same manner as in Example 1.

At the end of the stationary phase, the propylamine given off corresponded to 4.85 eq/kg, i.e., a degree of conversion of 81%.

The mixture was then permitted to cool to room temperature. After cracking in an acetone/solid carbon dioxide bath, the polymer had a softening temperature of 50° C. and a bonding temperature of 80° C., measured on a Kofler bench.

The precursor obtained was retained in the reactor and heating was resumed under the conditions given in the following Table:

| TEMPERATURE (°C.) | RATE OF STIRRING (rev/min) | DURATION (h) | PROPYLAMINE GIVEN OFF (eq/kg) |
|---|---|---|---|
| 150 | 3 | 3 | 0 |
| 150 | 180 | 4 | 0.04 |
| 180 | 3 | 4 | 0.04 |
| 180 | 180 | 1 | 0.4 |
| 190 | 180 | 0.5 | 0.4 |
| 200 | 180 | 1 | 0.4 |
| 220 | 180 | 0.5 | 0.18 |

At the end of this thermal treatment, the total amount of amine given off was 5.03 eq/kg, which corresponds to a degree of conversion of 84%. The polymer, which was dark brown in color, then had a bonding temperature of 105° C. and a softening temperature of 130° C. The molecular weights obtained by GPC were $M_n=1,100$ and $M_w=1,800$.

2. Spinning of the polymer obtained

The polymer was spun in the molten state, for 45 minutes, at a mean temperature of 150° C., using a nozzle which, after filtration (0.5 μm Fuji filter and 40 μm metal sieves) and distribution, emerged on a die plate pierced with 7 orifices having a diameter and height of 0.23 mm. The total polymer flow rate was 0.23 cm³/min. By drawing off filaments under the die, at a take-up speed of 15 m/min, a yarn containing 7 filaments with a unit diameter of 50 μm and yarn count of 290 dtex was obtained.

3. Pyrolysis of the fibers

The fibers were pyrolyzed under ammonia to 1,000° C., at a rate of 12° C./h with a stationary phase of 2 hours at this temperature. The weight loss was only 46%, whereas, for a less condensed aminoborazine, it usually ranged from 54 to 57%. The individuality of the filaments was preserved: the stability of the polymer therefore did not adversely affect its ability to crosslink.

After pyrolysis at 1,800° C. under argon, the fibers were white. They had a density of 2.014 (theoretical 2.28).

EXAMPLE 7

Polycondensation in solution 77 g of B-tris(methylamino)borazine and 59 g of anhydrous NMP were added, under argon, to a 250 ml open reactor. The mixture was stirred with a metal anchor at 200 rev/min until the solution became homogeneous and clear. The solution was then heated to around 180° C. After 2 hours, 35 minutes, of such treatment, a transparent collodion was obtained having a viscosity in the region of 876 poises (at 23° C.). This collodion comprised 55 g of NMP and 73 g of polyaminoborazines. Such collodion can be used for the preparation of fibers based on boron nitride.

EXAMPLE 8

59.5 g of B-tris(methylamino)borazine were charged, under argon, into a 250 ml open reactor. The reactor, stirred by a metal anchor rotating at 3 rev/min, was immersed in a bath at 100° C. The B-tris(methylamino)borazine liquefied rapidly. The temperature of the bath was increased to 200° C. over 10 minutes. The mass began to boil and was permitted to react for 17 hours at this temperature under conditions such as described in Example 1. After cooling, a solid (41.3 g) was obtained which had a bonding temperature of 190° C. The weight loss wets 27.5%.

The molecular weights obtained by GPC were $M_n=810$ and $M_w=1,230$.

This polymer was then spun from the molten state under the following conditions:

| | |
|---|---|
| Nominal extrusion temperature: | 225° C., |
| Die temperature (regulator): | 235° C., |
| Total polymer flow rate: | 0.754 cm³/min, |
| Capillary flow rate: | 0.11 cm³/min, |
| Residence time in the molten state: | 15 minutes, |
| Rate of passage at the capillaries: | 2.6 m/min, |
| Maximum take-up speed: | 340 m/min, |
| Weave half-angle: | 7°, |
| Minimum theoretical diameter: | 20 μm, |
| Maximum degree of drawing measured: | 370, |
| Minimum diameter measured: | 12 μm. |

The polymer was extruded without difficulty. The stability to spinning of the polymer was greater than or equal to 15 minutes. The quality of the yarn, at the die outlet, makes it possible to deposit it on a support with a weave half-angle of 7°. The quality of the yarn was also very satisfactory in appearance.

EXAMPLE 9

1. Polycondensation 45.8 g of B-tris(methylamino)borazine were introduced, under an argon atmosphere, into a 300 ml open three-necked flask.

Stirring was provided by an anchor whose rate of rotation was 3 rev/min. The setup was rendered inert by a nitrogen stream (5 l/h) in the headspace of the reactor. The latter was immersed in a metal bath at 100° C. and the temperature of the bath was then increased to 200° C. at the rate of 1° C./min. The temperature was then maintained stationary at this value for 17 hours.

During the reaction, purging of the reactor by a nitrogen stream was halted and the methylamine produced remained in the headspace of the reactor. The excess methylamine which diffused was assayed by 2N hydrochloric acid in the same manner as in Example 1.

After 17 hours at 200° C., the polymer was liquefied and remained at the bottom of the reactor. The rate of rotation of the anchor was then increased to 100 revolutions/minute. The product was rapidly flattened onto the wall of the reactor. The reactor was thus heated for 5 additional hours at 200° C. before being permitted to cool to 25° C. The polymer cracked on cooling.

The methylamine given off corresponded to 4.13 eq/kg. The weight loss was 7 g, i.e., 15.3%.

The polymer had a bonding temperature of 160° C. and a softening temperature of 185° C. measured on a Kofler bench.

The molar weights obtained by GPC were: $M_n$=1,890 and $M_w$=5,370.

Thermogravimetric analysis of this polymer at 800° C. under helium indicated a yield of approximately 65%.

2. Spinning of the polymer obtained

The polymer was extruded by melting, by shearing flow and by drawing in the molten state. The assembly was maintained at temperature via two heating collars, one at the height of the melting cone (softening temperature) and the other at the level of the die (die temperature). The fibers were collected on a bobbin and the entire assembly was rendered inert under an argon stream.

The spinning conditions were the following:

| | |
|---|---|
| Die diameter: | 31 mm |
| Number of orifices: | 23 |
| Diameter of the orifices: | 0.23 mm |
| Filtration bed: | 100 μm Fuji metal |
| Spinning temperature: | 181–186° C. |
| Take-up speed: | 100 to 200 m/minute |
| Strand diameter: | 10 to 30 μm |

The crude fibers thus prepared had the following characteristics:

Stress: 15 MPa

Modulus: 8.4 GPa

Elongation: 1.2%

These fibers, observed in an optical microscope, were clean, white and silky.

The thermogravimetric analysis of these fibers at 800° C. under helium evidenced a yield of approximately 65%.

3. Pyrolysis of the fibers

The fibers obtained above were ceramized under an ammonia stream of 25° C. to 1,000° C. with a rate of temperature increase of 600° C./h. Cooling to room temperature was carried out under argon.

No damage or breaking of the fiber was observed. The weight loss was 55%.

The fibers obtained were clean and had a diameter of 15 to 23 μm.

These fibers are then pyrolyzed at 1,800° C. under a nitrogen purge (20 l/h). The rate of temperature increase was 50° C./h between 25° and 1,000° C. and then 20° C./h between 1,000° C. and 1,800° C. The weight loss during this phase was 10%. The fibers had a diameter on the order of 10 to 20 μm.

EXAMPLE 10

1. Polycondensation

The apparatus and the process were identical to those of Example 9. 43.3 g of B-trimethylaminoborazine were charged. The mixture was permitted to react at 200° C. for 25 h with stirring at 3 rev/min and 5 h with stirring at 100 rev/min. The polymer at 200° C. was very fluid. After cooling to 25° C., the polymer existed in the form of a solid with a bonding temperature of 165° C. and a softening temperature of 190° C., measured on a Kofler bench.

The methylamine given off corresponded to 4.3 eq/kg. The weight loss was 7 g, i.e., 16.2%.

The molecular weights measured by GPC were: $M_n$=2,040 and $M_w$=7,730.

2. Spinning of the polymer obtained

The same apparatus was used as that described in Example 9, only certain parameters being modified:

Spinning temperature: 181°–186° C.

Take-up speed: 100 to 200 m/minute

Strand diameter: 10 to 30 μm

The crude fibers thus prepared had the following characteristics:

Stress: 12 MPa

Modulus: 8 GPa

Elongation: 1%

These fibers, observed in an optical microscope, were clean, white and silky.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a homogeneous polyaminoborazine, the process comprising a step of thermally polycondensing a trifunctional aminoborazine at polycondensation reaction equilibrium.

2. The process as defined by claim 1, said trifunctional aminoborazine comprising a cyclic compound having the formula:

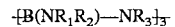

wherein $R_1$, $R_2$ and $R_3$, which may be identical or different, are each a hydrogen atom, or a saturated or unsaturated alkyl or aryl radical.

3. The process as defined by claim 2, wherein said structural formula $R_3$ is a hydrogen atom and/or $R_1$ and $R_2$ are alkyl radicals.

4. The process as defined by claim 3, wherein said structural formula, $R_1$ and $R_2$ are saturated alkyl radicals.

5. The process as defined by claim 4, wherein said structural formula, $R_1$ and $R_2$ are saturated $C_1$ to $C_4$ alkyl radicals.

6. The process as defined by claim 1, comprising controlling the temperature and the partial pressure of the amines of polycondensation.

7. The process as defined by claim 6, comprising proportionately increasing the temperature of polycondensation in response to an increase in the partial pressure of the amines of polycondensation.

8. The process as defined by claim 1, carried out at a temperature ranging from 150° to 350° C.

9. The process as defined by claim 8, carried out at a temperature ranging from 200° to 250° C.

10. The process as defined by claim 1, carried out under an inert gaseous atmosphere.

11. A monodisperse, homogeneous polyaminoborazine.

12. The monodisperse, homogeneous polyaminoborazine prepared by the process as defined by claim 1.

13. A shaped article comprising the monodisperse, homogeneous polyaminoborazine as defined by claim 11.

14. A shaped article comprising the monodisperse, homogeneous polyaminoborazine as defined by claim 12.

15. The shaped article as defined by claim 13, comprising a fiber, film, matrix, coating, powder, particulate or solid.

16. The monodisperse, homogeneous polyaminoborazine as defined by claim 11, displaying the gel permeation chromatogram shown in the Figure of Drawing.

17. The process as defined by claim 1, wherein amine having a partial pressure other than 0 is produced during the polycondensing of the trifunctional aminoborazine.

* * * * *